United States Patent [19]
Cancellieri et al.

[11] Patent Number: 5,594,208
[45] Date of Patent: Jan. 14, 1997

[54] MOLDED PLASTIC ELECTRIC OUTLET BOX WITH SNAP-ON BASE AND SNAP-ON FACE PLATE

[75] Inventors: Salvatore A. Cancellieri, Plainville; Wilfred R. Rogers, Bristol, both of Conn.

[73] Assignee: The Wiremold Company, West Hartford, Conn.

[21] Appl. No.: 382,887

[22] Filed: Feb. 2, 1995

[51] Int. Cl.$^6$ ........................................................ H02G 3/08
[52] U.S. Cl. .......................... 174/58; 220/3.92; 439/535
[58] Field of Search ............................... 174/53, 57, 58; 220/3.5, 3.9, 3.92, 3.94, 4.02; 439/535

[56] References Cited

U.S. PATENT DOCUMENTS

| | | | |
|---|---|---|---|
| 2,611,460 | 9/1952 | Nash | 220/3.94 X |
| 2,625,288 | 1/1953 | Clark et al. | 220/3.94 |
| 4,023,697 | 5/1977 | Marrero | 220/3.92 X |
| 4,135,633 | 1/1979 | Lockwood et al. | 220/3.94 |
| 4,500,746 | 2/1985 | Meehan | 174/48 |
| 4,669,804 | 6/1987 | Munroe | 439/535 X |

Primary Examiner—Kristine L. Kincaid
Assistant Examiner—Paramita Ghosh
Attorney, Agent, or Firm—McCormick, Paulding & Huber

[57] ABSTRACT

A three component electrical outlet box suitable for surface mounting is provided with a base having both locating legs and relatively rigid upstanding posts that are adapted to receive one of a plurality of covers, each cover having inwardly projecting lugs in its flexible side walls to be received in openings defined for this purpose in the posts. An electrical device such as a duplex plug with threaded fasteners supplied thereon is adapted to be assembled with the outlet box as a result of the fasteners being received in unthreaded openings defined in the top wall of the box or cover. The flexibility of the box side walls coupled with a bisector slot provided in each top wall end portion parallel the side walls assures entry of the threaded fastener without threading, and removal of the fastener only by unthreading or by manually spreading the slots side walls. A face plate is provided for quick assembly with the cover and is received in openings that also serve as convenient access for a tool to spread the side walls to facilitate disassembly of the cover from the base.

16 Claims, 7 Drawing Sheets

MOLDED PLASTIC ELECTRIC OUTLET BOX WITH SNAP-ON BASE AND SNAP-ON FACE PLATE

BACKGROUND OF THE INVENTION

1. Field of the Invention

The present invention relates to the fabrication of molded plastic electric outlet boxes, and relates more specifically to an improved electric outlet enclosure of the type having a plurality of components one of which is a universal base for receiving boxes of different depth. The box is configured to receive a snap-on face plate. The molded plastic box is also adapted to receive a conventional electric devices such as duplex plugs or switches with simplified push-in fastener openings that do not require threading the fasteners in place.

2. Description of the Prior Art

Plastic frames for the mounting of interchangeable electrical devices are known in the art. For example, U.S. Pat. No. 3,964,705 illustrates a molded one piece frame having resilient integrally molded posts that flex outwardly to receive electrical devices to be mounted in the frame. The '705 patent does not show or suggest an enclosure defined by a base and a snap-on box for housing an electrical component and that permits one of a plurality of boxes to be used on a single universal frame or base.

U.S. Pat. No. 3,689,868 illustrates a snap-on face plate which defines a cord enclosure in conjunction with another enclosure component. Cooperating posts are defined in part both on the face plate and on the other component. However, the '868 patent disclosure does not relate to a multicomponent enclosure for mounting an electrical device or duplex plug. This patent merely shows a fixed frame around which an electrical cord can be wound. In this '868 patent there is no suggestion for a base plate adapted to receive a molded box suitable for housing a duplex plug or switch.

U.S. Pat. No. 4,500,746 shows a self-contained electrical device that is designed to eliminate the need for a molded plastic outlet box altogether. The electric device, such as a switch, is received on a base that is in turn provided with wires that are so located as to engage contacts provided in the switch. The switch is designed to be assembled with a base by means of resilient upstanding posts that latch into appropriate openings defined for them in the frame or base.

U.S. Pat. No. 4,857,669 shows a plurality of integrally molded posts 42, each of which has a notched end 44 adapted to receive a projecting portion of an electrical component to be assembled therewith. This patent like the above mentioned prior art patents merely shows that it is old to provide resilient posts with latches adapted to be received in openings provided for this purposes in another component to be assembled therewith.

U.S. Pat. Nos. 5,170,013 and 5,170,014 disclose an electrical outlet box with molded plastic end walls defining threaded fastener openings adapted to receive a fastener by simply pushing the fastener into the opening. The fastener openings have integrally formed threads provided in the molded plastic so once the fastener has been pushed into place removal requires that the fastener be unthreaded. The subject application shows for the first time how a push in fastener can be used with a molded plastic outlet box without the need for threads being formed in the plastic itself. In the structure disclosed herein greater resilient flexibility is provided for the plastic fastener hole defining portion. Each such portion defines a hole which is tapered in cross-sectional size from an enlarged entry end into a necked-down star-shaped inner-end.

U.S. Pat. No. 4,983,785 shows a molded plastic outlet box having end walls that define three outwardly open slots, the middle slot having an enlarged hole for receiving a fastener equal in length to the axial extent of the hole. This fastener hole has a threaded outer or upper axial end portion and a reduced diameter inner portion that requires self tapping by rotation of the threaded fastener. In the present invention the fastener hole need not be threaded, nor is it defined by outwardly open slots.

SUMMARY OF THE INVENTION

A general purpose and object of the present invention is to provide a molded generally rectangular base with upstanding locating legs and upstanding structural posts integrally formed in the base, and to provide a plurality of molded rectangular boxes or covers of different depth that are downwardly open and adapted to receive these upstanding legs and posts. The box side walls define inwardly projecting tabs or lugs that are adapted to be received in channel shaped openings of the posts to secure the cover or box to the base. The upstanding posts that provide the structural support with the side walls of the cover or box do not flex, and instead each box is configured with a relatively large opening in its top wall to allow flexing of the side walls during assembly.

Another object of the present invention is to provide for access openings in the top wall of the cover or box so as to permit the use of a screw driver or other tool to be inserted in these access openings for releasing the outlet box or cover from the underlying frame or base.

Still another object of the present invention is to provide a unique snap-on configuration for assembling a face plate to the cover or box without the need for conventional fasteners.

A still further object of the present invention is to provide for quick mounting of a conventional electrical device such as a duplex plug or a switch by the use of conventional fasteners that need only to be pushed in place into openings provided for them in the box or cover. The configuration of the openings or holes for receiving the fasteners is such that the box or cover deforms resiliently to receive the fasteners when they are pushed in place. The box resiliently returns to a locking position to securely hold the fasteners once they have been pushed into their associated holes or openings.

These objects are accomplished in accordance with the present invention by providing a molded rectangular base having upstanding legs adjacent its four corners for locating the corners of one of a plurality of various size downwardly open rectangular boxes also of molded plastic. The base also includes upstanding relatively rigid posts, each post defining a channel shaped slot, and each post further includes openings in the web portion of the channel for receiving inwardly projecting lugs defined for this purpose on the inside walls of the rectangular box.

The molded plastic box also includes a top wall having access openings in vertical alignment with these channel shaped slots to allow insertion of a tool such as a screw driver for releasing these lugs from the web openings in the channel shaped posts of the base.

The top wall of the box also defines an opening for receiving the electrical device such as an outlet plug or switch, and the sides of this electrical device opening are preferably proximate or adjacent the side walls of the box or cover. The edges of the electrical device opening are spaced from the end walls of the box or cover, thereby providing the necessary resilient flexibility for the side walls for facilitating assembly of the box with the base.

A face plate also of molded plastic configuration is adapted to be secured to the top portion of the box as a result of depending lugs provided for this purpose and arranged to be received in the aforementioned access openings. The face-plate is resiliently deformable in bending so as to facilitate assembly with the top wall of the box or cover. Disassembly is accomplished by bending the face plate in the same direction as a result of inserting a screw driver between it and the top portion of the box midway between these depending lugs.

Another important feature of the present invention that also takes advantage of the side walls of the box being resiliently deformable, coupled with the further provision for a unique slot configuration in the top wall end portions adjacent to the end walls of the box, allows the fastener openings for receiving threaded fasteners to be readily enlarged to permit quick assembly of a typical electrical device. The threaded fasteners normally require unthreading for removal for replacement of the electrical device. However, the slots in the top wall end portions have an enlarged portion to admit a tool such as a screwdriver to spread the slot and allow removal of each threaded fastener without unthreading.

In accordance with the present invention an electric outlet box is disclosed having side and end walls integrally molded to a top wall that not only defines an opening for receiving an electrical device such as a plug or switch, but which also includes end portions adjacent to the end walls of the outlet box that are divided into generally equal area sectors by a bisector slot having an open end communicating with the electrical device opening. A cross-slot is oriented transversely to this bisector slot whereby downward pressure on a fastener associated with the electrical device depresses sectors of the top wall end portion by pivoting of these sectors along flex lines or oriented parallel the bisector slot. This geometry serves much the same purpose as does the resilient flexibility of the box side walls in that both have the same general purpose, namely to permit ready insertion of a fastener in an associated fastener hole followed by a gripping action on the fastener once the fastener has been pushed into place to hold the electrical device in its opening.

BRIEF DESCRIPTION OF THE DRAWINGS

A more complete understanding of the invention and many of its attendant advantages will be readily appreciated as the same become better understood by reference to the following detailed description when considered in conjunction with the accompanying drawings wherein.

DETAILED DESCRIPTION

Figure 1:
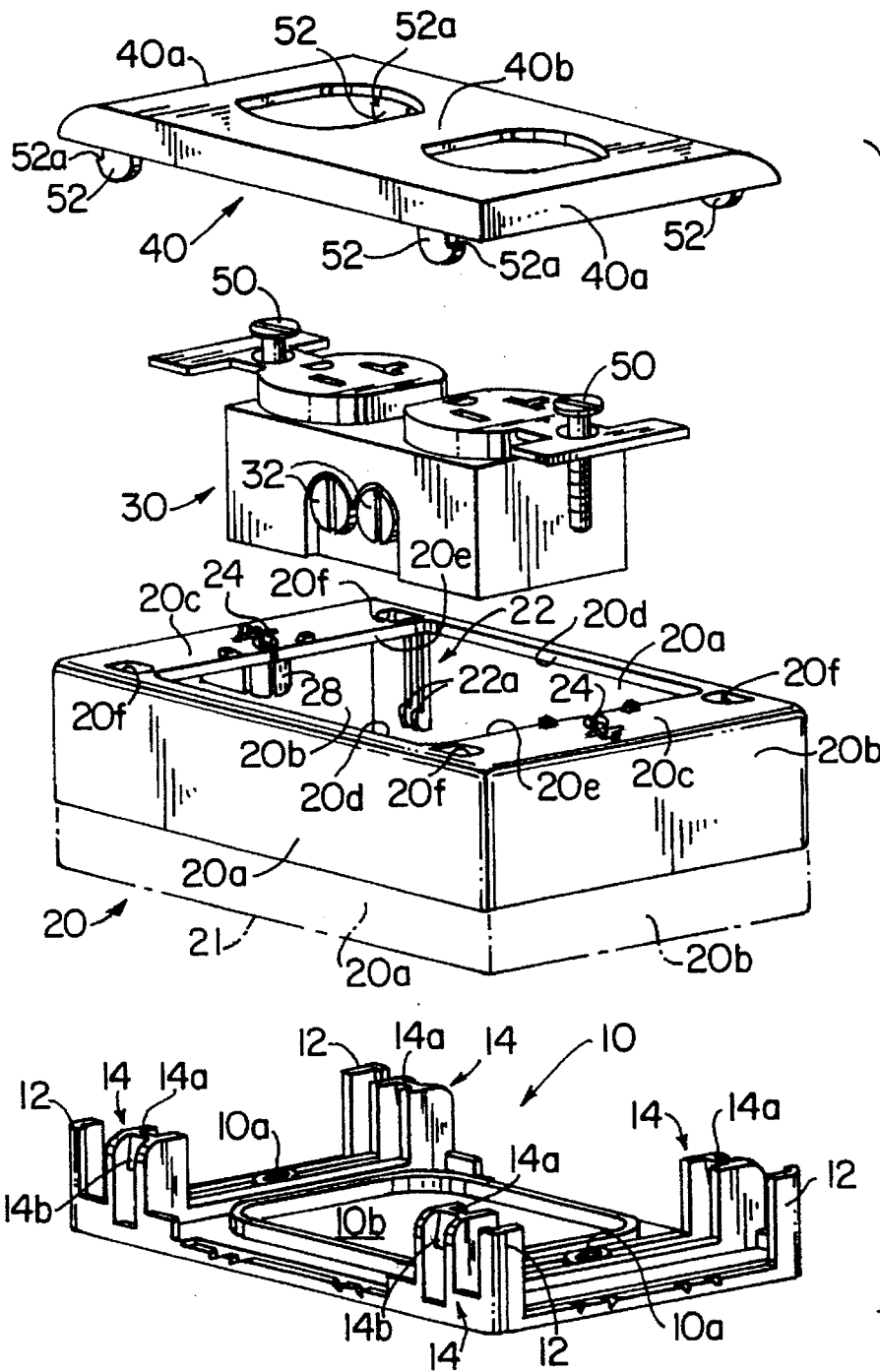
FIG. 1 is an exploded top perspective view of the components of an outlet box constructed in accordance with the present invention, and also shows an electrical device of the duplex plug type for mounting in this outlet box. A slightly larger box is shown in phantom lines.

Turning now to the drawings in greater detail, and referring specifically to FIG. 1, an electrical outlet box constructed of components capable of being assembled in accordance with the present invention is shown in exploded relationship, and with an electrical outlet device 30 included for reference purposes.

As shown, three components of an electrical outlet box are depicted in FIG. 1, a base or frame 10, a downwardly open box or cover 20, and a face plate 40. An electrical device 30 is adapted to being quick mounted in the box 20 according to the invention.

The molded plastic base or frame 10 has openings indicated generally at 10a, for receiving mounting screws (not shown) that provide a convenient means for attaching the base 10 to an existing wall structure or baseboard. A knock-out panel 10b provides an opening for wires (not shown) that would be connected conventionally to an electrical device, such as the duplex plug illustrated at 30. Screws 32,32 are provided for this purpose on plug 30.

Still with reference to FIG. 1 the molded plastic frame or base 10, has four upstanding locating legs 12,12 provided at the four corners of the generally rectangular base so as to be received at the four interior corners of the downwardly open rectangular box or cover 20. In accordance with the invention four relatively rigid upstanding posts 14,14 are provided adjacent these locating legs 12,12. Each post 14 is generally H-shaped in cross-section, and thus defines an outwardly open channel. The web portion 14a of each channel shaped post defines an inclined cam surface 14b for receiving a rib 22 defined for this purpose on the interior side walls of the downwardly open box 20. Each of these channel shaped webs 14a has an opening with a lower edge that is adapted to receive abutment surfaces 22a defined for this purpose in the ribs 22 of the cover or box 20. The base 10 also has four access ports 16 for receiving a screwdriver (not shown) that can be inserted and twisted to facilitate disassembly of the cover or box 20.

Figure 2:
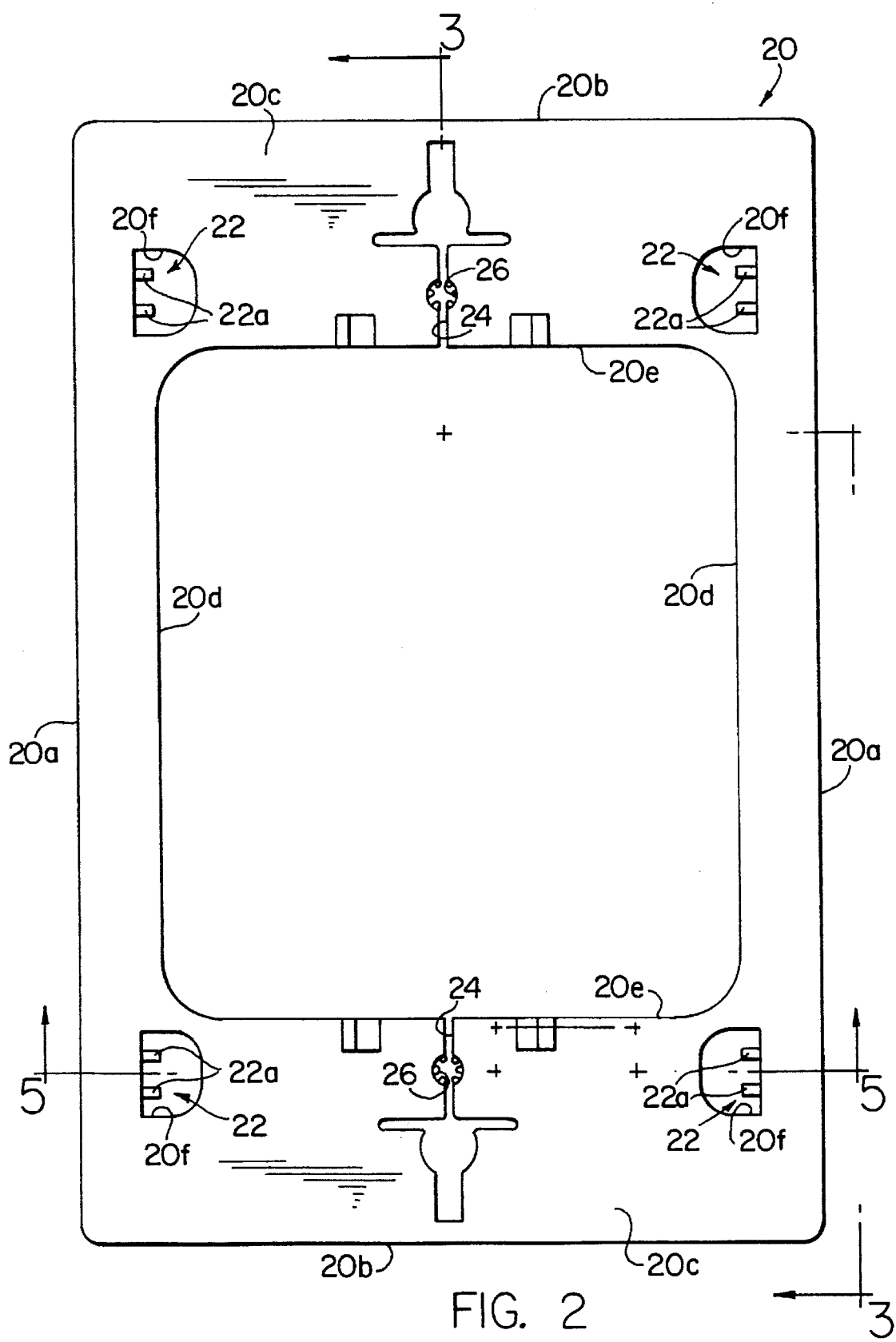
FIG. 2 is a top plan view of the downwardly open box component of FIG. 1.

Turning now to a more detailed description of the molded plastic cover or box 20, FIG. 2 shows the cover 20 as an integrally molded component including integrally molded side walls 20a and end walls 20b together with an integrally molded top wall defined essentially by top wall end portions 20c. Thus, box 20 includes a large generally rectangular top opening for receiving the electrical device or outlet plug 30. Conventional duplex plugs of the type shown generally include threaded fasteners such as indicated generally at 50 in FIG. 1. Such fasteners 50 comprise one or another standard electrical thread. However, these common thread sizes will generally have a common diameter. The number of threads per inch may vary but the fasteners will have the same general diameter. The present invention provides unique fasteners openings for receiving such differently threaded fasteners. These openings are defined in the top wall end portions 20c of the molded plastic box 20 and will be described in greater detail hereinafter.

Figure 1A:
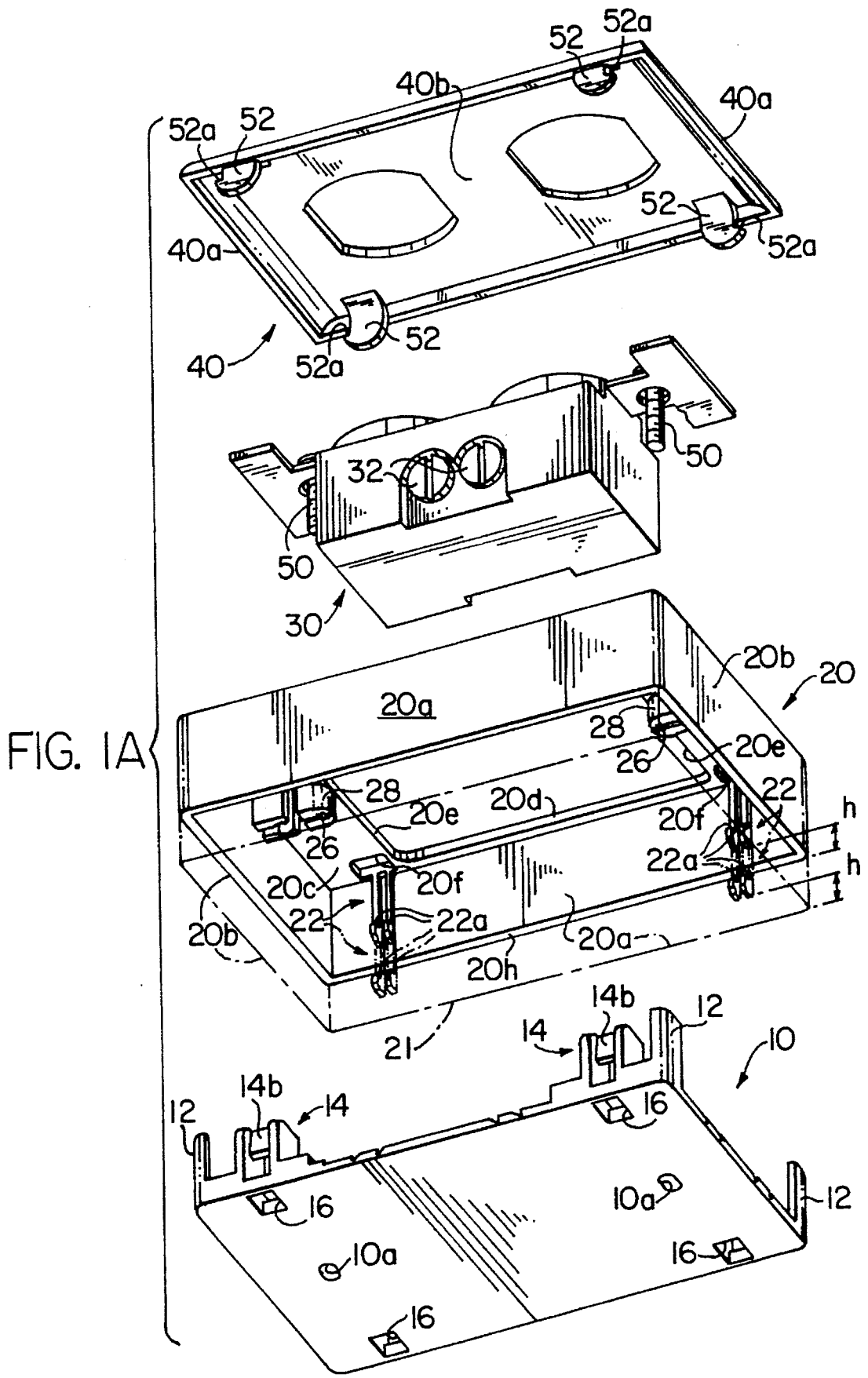
FIG. 1A is a bottom perspective view of the same components of the outlet box constructed in accordance with the present invention, and also shows the electrical device of the duplex plug type for mounting in this outlet box. Again, the somewhat deeper box is shown in phantom lines.

Still with reference to FIG. 2, the generally rectangular molded plastic box 20 defines a generally rectangular top opening with opposed edges 20e defined by the facing edges of the top wall end portions 20c. Further, the rectangular top opening also includes longer opposed edges 20d oriented parallel to the side walls 20a of box 20, and preferably located in close proximity to the side walls 20a so as to allow for resilient flexibility of the side walls 20a, at least between the top wall end portions 20c,20c. It is this flexibility of the side walls 20a that allows the necessary clearance for the ribs 22, and more particularly the abutment surfaces 22a thereof to pass by the cam face 14b of the channel shaped post 14 in the base 10 during assembly of the box 20 with the base 10. These ribs 22 are located beneath the top wall end portions 20c of the box 20. Openings 20f are provided above these ribs in each top wall end portion 20c to allow insertion of a screwdriver to release the cover 20 from the base 10. As best shown in FIG. 1A, the vertical height of the box or cover 20 may vary. See the deeper box 21 shown in phantom lines. It is otherwise identical to the box 20, except for the length of the ribs 22. The deeper box 21 has ribs long enough to define the same space between the ribs 22a and the bottom edge of both boxes. See the dimension "h" illustrated in FIG. 1A. As so constructed and arranged boxes of various depths can be fitted with the same base or frame 10. It is an important feature of the present invention that an elongated bisector slot 24 is provided the full width of each top wall end portions 20c, that is between the edge 20e of the opening in the top wall and the inside of the end wall 20b of the cover 20. These slots 24,24 assure that the longer side walls 20a of the box will move outwardly upon assembly of the cover with the base, and will resiliently contract following assembly of these components.

Figure 5:
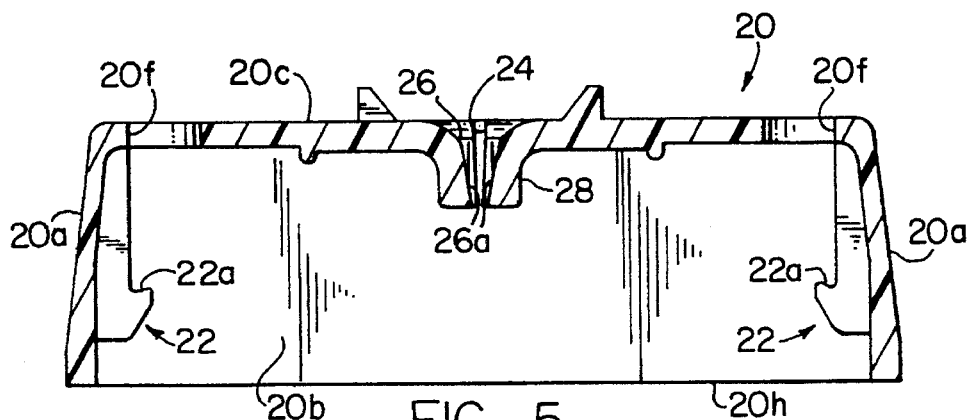
FIG. 5 is a sectional view taken on the line 5,5 of FIG. 2.
Figure 3:
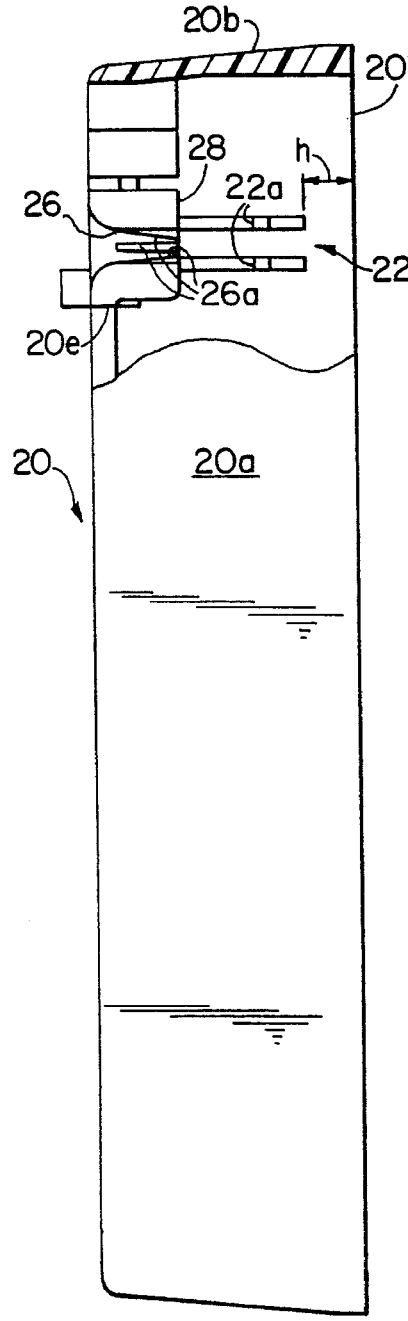
FIG. 3 is a sectional view taken on the line 3,3 of FIG. 2.
Figure 4:
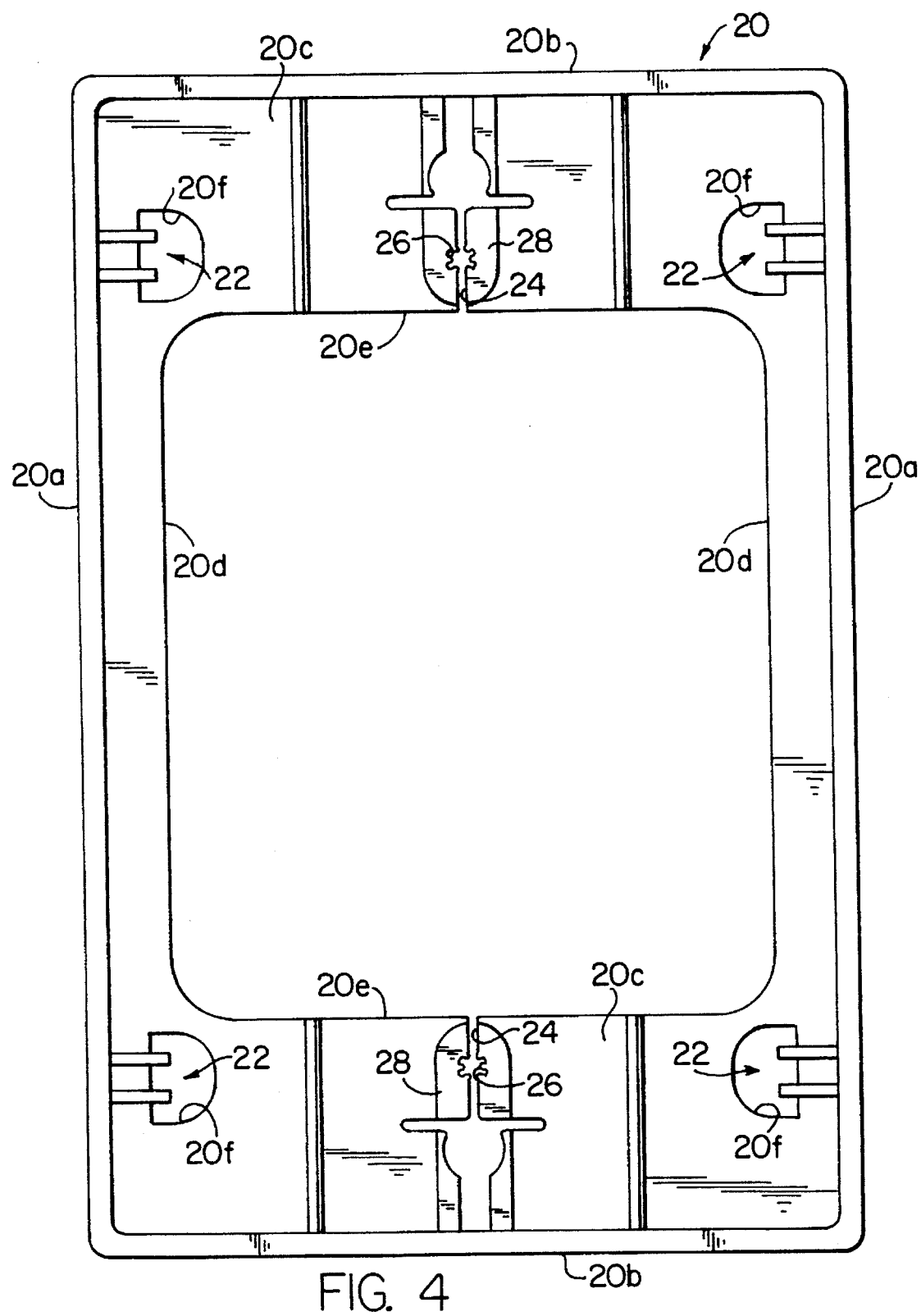
FIG. 4 is a bottom plan view of the FIG. 2 box.
Figure 8:
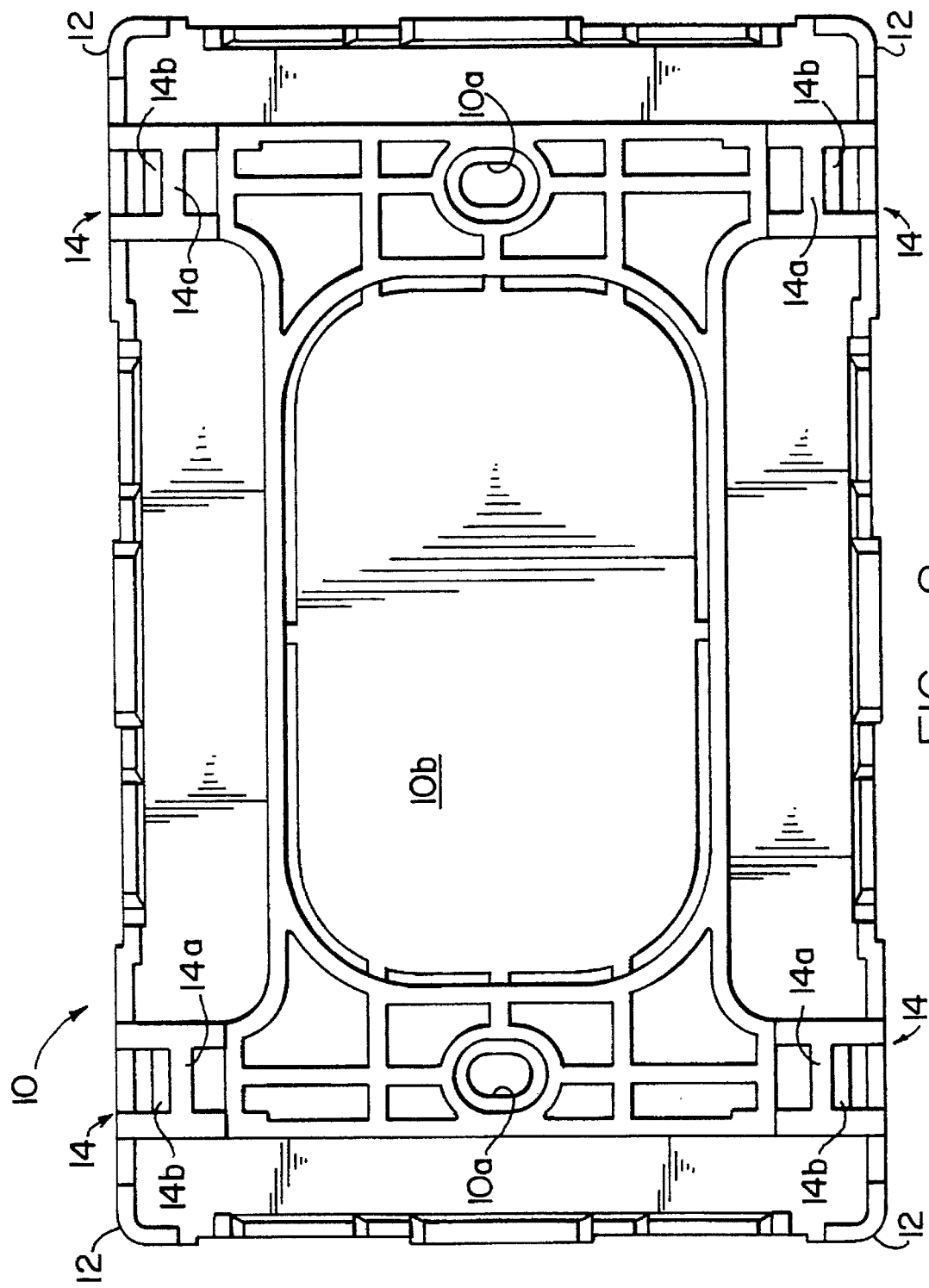
FIG. 8 is a top plan view of the base or frame for receiving the box of FIGS. 2 through 7.
Figure 9:
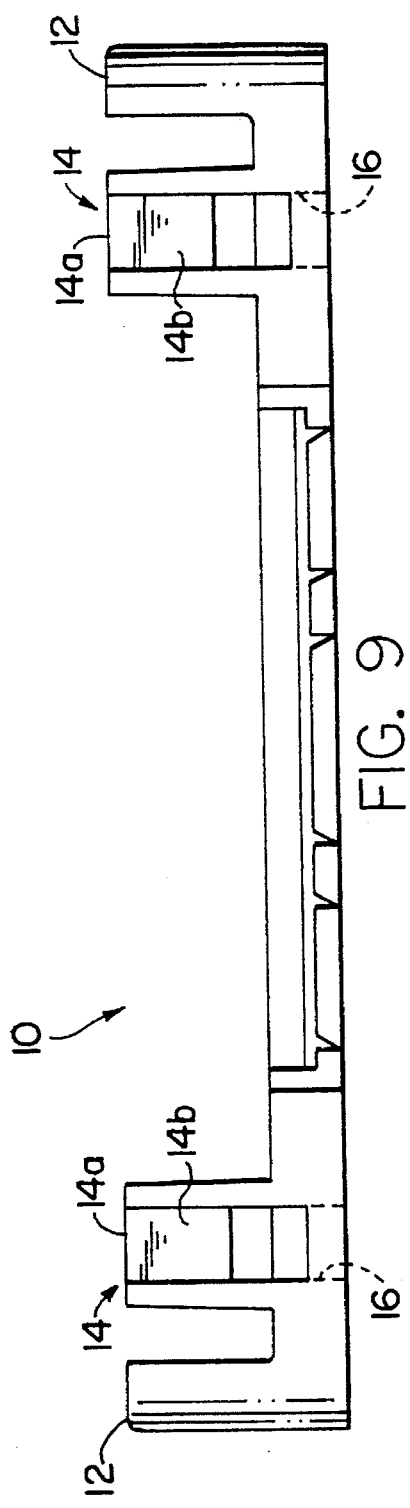
FIG. 9 is a side elevational view of the base shown in FIG. 8.

Turning now to a more detailed description of each of the bisector slots 24 in each top wall end portion 20c of the box 20, each slot 24 has an enlarged region 26 that appears from the top view of FIG. 2 to have a generally circular contour, but which in the bottom plan view of FIG. 4 can be seen to have a generally star-shaped configuration. More specifically, and with particular reference to FIG. 5, the slot 24 and particularly the enlarged region 26 thereof is provided with a vertical extent or height that is enhanced by a boss 28 provided integrally with the top wall end portion 20c. This boss defines a tapered fastener opening or hole 26 that affords progressively more gripping force on the threaded fastener as the fastener is inserted therein. The enlarged region or hole 26 is designed to receive the fastener 50. However, and as suggested in FIG. 10, the tapered ribs 26a grip the fastener threads at assembly of the electrical outlet plug with the cover or box 20. Still with reference to the unique configuration for the fastener hole 26 defined by the boss 28, it will be apparent from FIG. 5 and FIG. 6 that the overall cross-sectional size of this hole varies from a maximum at the top surface of the cover or box in FIG. 5 to a minimum at the lower or inner end of the boss 28. Thus, the overall configuration for the hole is generally not cylindrical, the presence of the tapered radially inwardly extended ribs 26a provides for significant engagement or gripping forces between the threaded fastener and the unthreaded hole 26 in the boss 28. As the fastener 50 is inserted, by a pushing action into the hole 26, the slot 24 expands slightly. Once in place the resilient side walls of the box hold the fastener in this unique hole 26.

Figure 6:
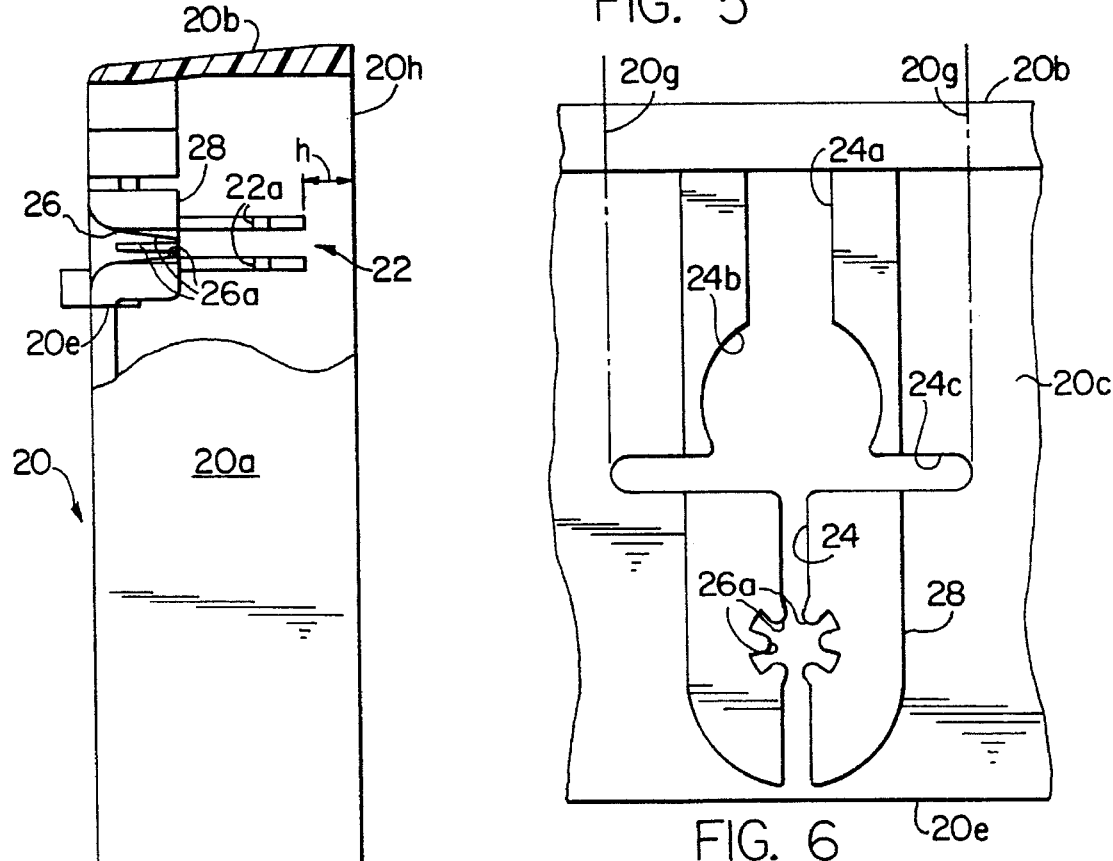
FIG. 6 is a bottom plan view showing to a somewhat larger scale than FIG. 4 one of the bosses for receiving one of the two fasteners normally provided with an electrical device of the type illustrated in FIGS. 1 and 1A.
Figure 7:
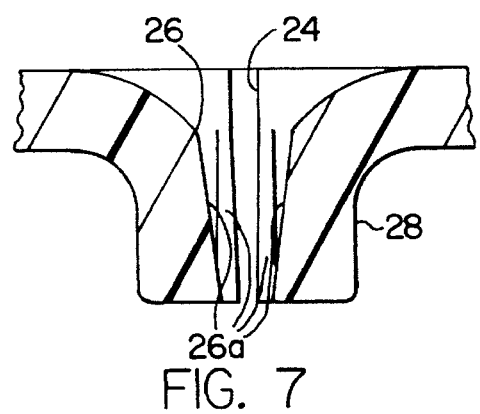
FIG. 7 is a sectional view showing to a somewhat larger scale the fastener hole configuration as defined by the box of FIG. 6.

Referring now specifically to FIG. 6, the boss 28 can be seen to define, at least in part the bisector slot 24, and the slot 24 extends from the edge 20e of the electrical outlet opening to the inside of the wall 20b. This slot configuration takes advantage of the inherent resilience of the side walls of the cover as mentioned previously, and provides for enlargement of the slot 24 and consequently of the fastener hole 26 defined by the boss 28 as the fastener is inserted. The slot 24 and associated fastener hole 26 are therefor adapted to slidably receive the threaded fastener 50 without any necessity for threading. However, unthreading is preferably required for removal of these fasteners 50.

The flexibility of the side walls 20a of the cover 20, in combination with the slot 24 extending from the edge 20e of the rectangular opening in the top wall of the cover through to the end wall 20b of the cover, affords the capability of expanding and contracting the width dimension of the slot 24 enhancing enlargement of the diameter of the opening 26 in order to facilitate assembly of the threaded fastener in this opening 26, and also assures the necessary clamping force by the boss 28 on the fastener 50 after assembly, so that unthreading of the fastener may be required in order to achieve disassembly of the electrical device and cover 20.

With particular reference to FIG. 6, the slot 24 includes inner portions 24a and 24b that are of larger width than the slot 24 associated with the enlarged region 26 defining the actual hole for the fastener. These inner slot portions 24a and 24b are wide enough to eliminate waste of the material otherwise required to mold the boss 28 in the area of the slot between the enlarged region or fastener hole 26 and the wall 20b of the cover or box 20. As a result of this enlarged inner slot configuration in the top wall portion 20c of the box cover 20 disassembly of the electrical device 30 from the cover or box 20 is facilitated. This enlarged inner slot configuration allows insertion of a tool such as a screwdriver for prying the split portions of the boss apart in order to allow for removal of the fastener 50 without necessarily requiring the unthreading mentioned previously. That is, with the face plate 40 removed and with the electrical outlet or duplex plug installed in the box 20 a screw driver can be placed into the enlarged inner slot area 24a and 24b with the result that the blade of the screw driver can be twisted causing the slot 24 to spread and hence the diameter of the fastener hole 26 to be increased sufficiently for allowing removal of the fastener 50 without unthreading the same.

Figure 10:
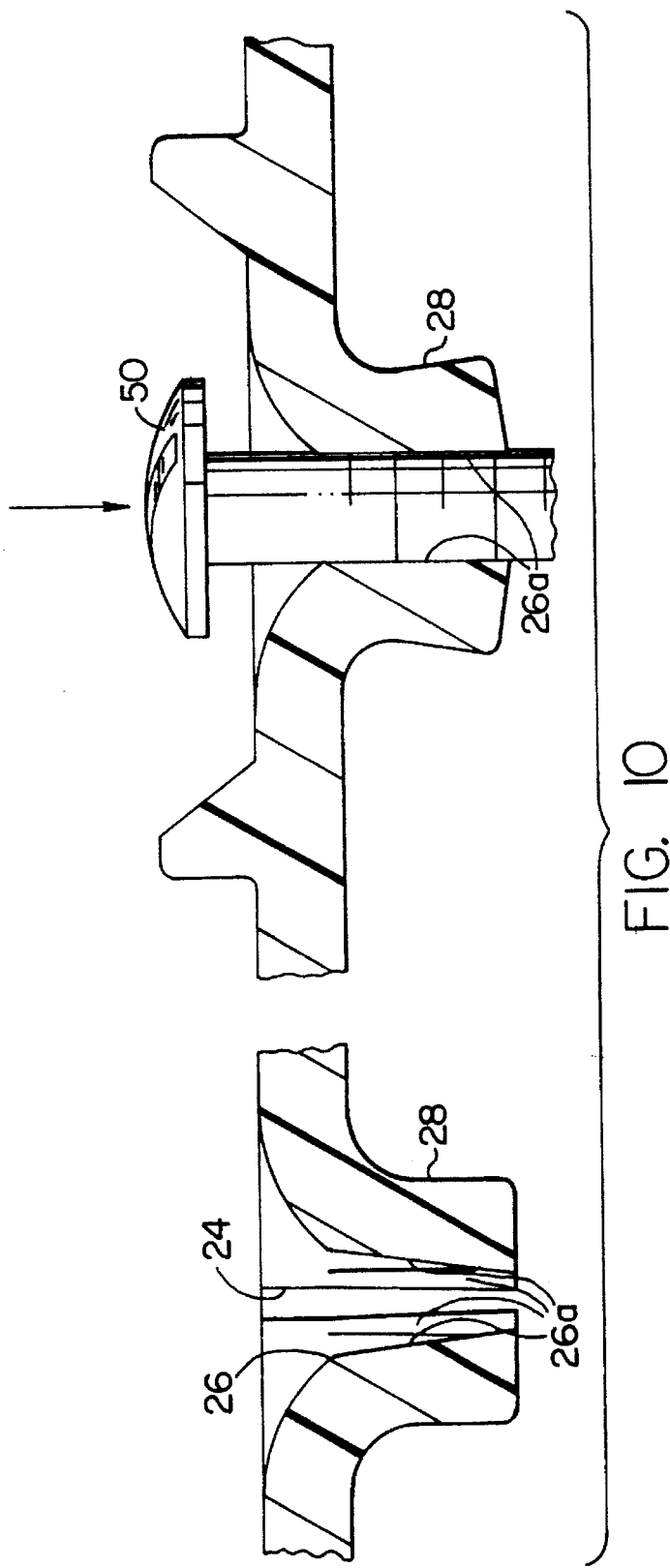
FIG. 10 shows the fastener hole of FIG. 5 in an undeformed position (left side) and during deformation due to inserting a fastener (right side).

With reference to FIG. 10, the capability for the fastener hole, to expand to receive the fastener 50 as a result of the fastener 50 being pushed into the opening 26 is an important feature of the present invention. This feature can be achieved not only by flexing the side walls 20a of the box 20 as described previously, but also by providing for downward flexing movement of the fastener hole defining regions of the top wall end portions 20c adjacent to the slot 24. A cross-slot 24c, best shown in FIG. 6, is provided transversely of the bisector slot 24. The bisector slot 24 has the enlarged inner portion 24a and 24b as described previously. The cross slot 24c cooperates with the opening edge 20e to define sectors of the top wall portion 20c that flex along flex axes 20g,20g (FIG. 6) thereby providing a convenient means to achieve depression of the region around the fastener hole 26 of the top wall end portion 20c.

Thus, this cross slot 24c configuration, when taken in combination with the aforementioned resilient flexibility for the side walls 20a, as described previously, provides very effective resilient enlargement of the slot 24 and the associated fastener hole 26 followed by contracting of the slot and hole to create the desired gripping forces for the molded boss 28 on the fastener 50 to assure that the electrical device remains in a secure condition within the molded plastic cover or box 20.

It is important to note that no threads are defined in the molded boss 28, and that the tapered configuration of the fastener hole 26, created by the tapered ribs defined on the inside surface of the hole 26, obviates the need for any requirement that a thread be formed in the plastic material. Furthermore, the fact that no threads need be formed in the plastic material also allows for fasteners of different thread size to be received in the same molded fastener opening without sacrificing to the security achieved in the assembly of these components.

Turning now to a description of the face plate 40, this molded plastic component of the outlet box of the present invention need not be secured to the underlying box 20 by a conventional fastener, but is instead adapted to be secured to the box 20 as a result of integrally molded feet or legs 52,52 provided adjacent the opposite ends 40a of the face plate 40. The plastic material of the face plate 40 is resiliently flexible so that the plate can bend along its longer dimension in order that the plate 40 center portion 40b be pushed downwardly toward the top of the cover or box 20 with the result that the curved lower edges of the feet or legs 52 enter the openings 20f defined for this purpose in the top wall end portions 20c. The resilient flexibility of the face plate 40 allows sufficient bending so that the feet or legs 52 will enter these openings 20f, after which the plate returns to the unstressed planar configuration shown. The abutments 52a of the feet or legs 52 then engage the underside of the top wall end portions 20c. Removal of the face plate 40 is accomplished by inserting a screw driver or other blunt instrument between the face plate center portion 40b and the box 20 and twisting the screwdriver to bend the face plate 40 in the opposite direction. If desired a clearance or relief slot can be provided in the face plate or cover to allow the screwdriver to be more easily inserted between the box 20 and the face plate 40 so as to bend the face plate 40 until the abutments 52a in the feet or legs 52 clear the underside of the top wall end portions 20c allowing the face plate 40 to be disassembled from the box.

It is a further feature of the present invention that the openings 20f in the top wall end portions 20c of the cover or box 20 are aligned with the ribs 22 provided in the inside walls 20a of the cover 20. Thus, disassembly of the cover or box 20 from the base or frame 10 is made possible by the use of the same screwdriver or blunt instrument being inserted in these openings 20f to separate the face plate from the cover.

It is important to note that the height of the cover or box 20 is such that it will accommodate a typical electrical device such as an outlet plug or switch. However, if a larger electrical device is to be utilized in a box of this type the same frame or base 10 can be used to receive a box of greater or lesser height provided only that the ribs 22 and more particularly the abutments 22a are provided in the same vertically spaced relationship (h) to the bottom edge 20h of the cover 20. In accordance with the invention, a plurality of boxes of different vertical dimension can be accommodated on the same base 10 as suggested by the phantom lines in FIGS. 1 and 1A of the drawings. Furthermore, the same face plate 40 can be used with boxes of different height as well. Obviously, the face plate 40 would have a different opening configuration in the event that the electrical outlet device being accommodated in the box 20 were a switch rather than a duplex outlet plug as shown in the drawings. Other devices might be mounted in a box of the type shown and described herein. Any electrical device, such as a jack or telecommunications connector, or groups of them, could be accommodated in a box or cover constructed in accordance with the teachings of this disclosure.

We claim:

1. An electrical outlet box comprising:

a molded generally rectangular base having upstanding legs integrally molded at the four corners of the rectangular base, and upstanding posts integrally formed adjacent said legs, each post defining a channel shaped slot that is upwardly opened, and each channel shaped post having a channel web portion that defines an opening into said upwardly opened channel, a molded rectangular box having side and end walls that define an open bottom, and corners for snugly receiving said upstanding legs to locate the rectangular box on the base, said base cooperating with said box to define an enclosure for an electrical device, said rectangular box side walls defining inwardly projecting ribs with abutment surfaces defined on said ribs to be received in said channel web openings whereby said box and base are releasably secured to one another.

2. The electrical outlet box of claim 1 wherein said rectangular box has a top wall integrally connected to said side and end walls, said top wall having access openings in vertical alignment with said channel shaped slots to allow insertion of a tool such as a screwdriver for releasing said abutment surfaces of said ribs from said channel web openings to achieve disassembly of said base from said box.

3. The electrical outlet box of claim 2 wherein said top wall defines a rectangular opening for said electrical device, said electrical device opening having sides that are approximate said side walls and ends that are spaced from said end walls to provide resilient flexibility for said side walls whereby limited movement of said side walls allows assembly and disassembly of said rectangular box from said face as aforesaid.

4. The electrical outlet box of claim 3 further characterized by a plurality of said rectangular boxes, some of said rectangular boxes having a height different than a height of said first mentioned box whereby any rectangular box selected from said plurality of boxes of different height is adapted to be received on the same base.

5. The electrical outlet box of claim 3 wherein said top wall comprises top wall end portions, and said access openings provided adjacent said side walls in said top wall end portions.

6. The electrical outlet box according to claim 5 further characterized by a face plate, said face plate having depending legs adapted to be received in said access openings of said top wall.

7. The electrical outlet box according to claim 6 wherein said face plate is formed from a resilient material and is deformable in bending resiliently between said depending legs, said legs defining abutment surfaces adapted to engage the underside of said top wall portions whereby assembly of said face plate and box is achieved by bending said face plate inwardly followed by locking together of the face plate and rectangular box as said face plate returns to its undeformed condition.

8. The electrical outlet box according to claim 1 wherein said rectangular box has top wall end portions integrally connected to said side and end walls of said rectangular box, said top wall end portions defining an electrical device opening therebetween, each said top wall end portion defining a bisector slot oriented parallel said side walls and spaced equidistantly therebetween, said bisector slots having open ends communicating with said electrical device opening, and said bisector slots having enlarged regions spaced from said open end for receiving fasteners to secure an electrical device in said rectangular box.

9. The electrical outlet box according to claim 8 wherein said side walls and said rectangular box are resiliently deformable in directions toward and away from one another whereby said bisector slots can be increased in width by flexing of said side walls outwardly, whereby to readily accommodate said fasteners and decreased in width to securely engage said fasteners in said enlarged regions of said bisector slots when said side walls are returned to a predetermined flexed condition.

10. The electrical outlet box according to claim 9 wherein said top end wall portions define depending bosses with said bisector slots defining said enlarged regions in the area of said bosses to increase the engagement or purchase provided for the fasteners in said securely engaged condition.

11. The electrical outlet box according to claim 10 wherein said bisector slots have closed ends opposite said open ends, said closed ends located adjacent said rectangular box and walls.

12. The electrical outlet box according to claim 10 wherein said enlarged regions of said slots, and particularly said enlarged slot regions defined by said depending bosses have an elongated axial extent of non-uniform cross-sectional hole configuration, each said enlarged region having an upper axial cross-sectional size of flared enlarged configuration, and each said enlarged region further having a lower axial cross-sectional size of reduced cross-sectional area whereby to exert a gripping action on the fastener.

13. The electrical outlet box of claim 12 wherein said axially elongated enlarged region of said bisector slot so defined by said boss has downwardly tapered ribs to effect said cross-section size reduction.

14. The electrical outlet box according to claim 12 wherein said reduced cross-sectional size of said enlarged hole region at the lower axial end of said boss has a star-shaped cross-section defined by said inwardly projecting ribs.

15. The electrical outlet box according to claim 14 wherein said enlarged regions of said bisector slots in said top wall end portions have upper axial ends flared as aforesaid, and wherein said boss define portions of said enlarged regions of said slots is generally star-shaped in cross-sectional shape, said ribs defined by said boss being tapered inwardly so that a lower end of said boss defines abutments at the lower face of said top wall end portion to engage threads of the fastener and thereby prevent its inadvertent removal.

16. The electrical outlet box according to claim 15 wherein each said bisector slot has an enlarged inner end portion adjacent said end wall of said rectangular box whereby to facilitate entry of a screwdriver into said bisector slot to spread said bisector slot and facilitate removal of the fastener without necessity for unthreading the fastener.

* * * * *

UNITED STATES PATENT AND TRADEMARK OFFICE
CERTIFICATE OF CORRECTION

PATENT NO. : 5,594,208
DATED : January 14, 1997
INVENTOR(S) : Cancellieri, et al.

It is certified that error appears in the above-indentified patent and that said Letters Patent is hereby corrected as shown below:

Column 5

Line 31, "22a" should be "22".

Column 8

Claim 4, Line 45, delete the word "rectangular".
Claim 4, Line 46, insert --rectangular-- before the word "boxes".

Column 10

Claim 14, Line 11, delete the word "hole".

Signed and Sealed this

Fifteenth Day of April, 1997

Attest:

BRUCE LEHMAN

*Attesting Officer*  *Commissioner of Patents and Trademarks*